US011953462B2

(12) United States Patent
Bellman et al.

(10) Patent No.: US 11,953,462 B2
(45) Date of Patent: Apr. 9, 2024

(54) GLASS ELECTROCHEMICAL SENSOR WITH WAFER LEVEL STACKING AND THROUGH GLASS VIA (TGV) INTERCONNECTS

(71) Applicant: CORNING INCORPORATED, Corning, NY (US)

(72) Inventors: Robert Alan Bellman, Ithaca, NY (US); Jeffrey Stapleton King, Menlo Park, CA (US); Scott Christopher Pollard, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 18/122,192

(22) Filed: Mar. 16, 2023

(65) Prior Publication Data

US 2023/0221278 A1  Jul. 13, 2023

Related U.S. Application Data

(62) Division of application No. 16/608,500, filed as application No. PCT/US2018/029732 on Apr. 27, 2018, now Pat. No. 11,630,076.

(Continued)

(51) Int. Cl.
*G01N 27/404* (2006.01)
*C03B 33/02* (2006.01)
(Continued)

(52) U.S. Cl.
CPC ....... *G01N 27/404* (2013.01); *C03B 33/0222* (2013.01); *C03C 15/00* (2013.01);
(Continued)

(58) Field of Classification Search
CPC .. G01N 27/404; G01N 27/413; G01N 27/327; G01N 27/3272; G01N 27/403; C03C 2217/254
See application file for complete search history.

(56) References Cited

U.S. PATENT DOCUMENTS

| 5,667,653 A | 9/1997 | Schneider et al. |
| 6,695,958 B1 | 2/2004 | Adam et al. |

(Continued)

FOREIGN PATENT DOCUMENTS

| CN | 102915993 A | 2/2013 |
| CN | 105403602 A | 3/2016 |

(Continued)

OTHER PUBLICATIONS

"Glass" posted by the Materials Science & Engineering department of the University of New South Wales—Sydney, author unknown; https://www.unsw.edu.au/science/our-schools/materials/engage-with-us/high-school-students-and-teachers/online-tutorials/ceramics/glass#:~:text=Glasses%20are%20a%20unique% (Year: 2023).*

(Continued)

*Primary Examiner* — Alexander S Noguerola
(74) *Attorney, Agent, or Firm* — Svetlana Short

(57) ABSTRACT

A method of forming a glass electrochemical sensor is described. In some embodiments, the method may include forming a plurality of electrical through glass vias (TGVs) in an electrode substrate; filling each of the plurality of electrical TGVs with an electrode material; forming a plurality of contact TGVs in the electrode substrate; filling each of the plurality of contact TGVs with a conductive material; patterning the conductive material to connect the electrical TGVs with the contact TGVs; forming a cavity in a first glass layer; and bonding a first side of the first glass layer to the electrode substrate.

9 Claims, 14 Drawing Sheets

Related U.S. Application Data

(60) Provisional application No. 62/491,408, filed on Apr. 28, 2017.

(51) Int. Cl.

| | | |
|---|---|---|
| *C03C 15/00* | (2006.01) | |
| *C03C 17/06* | (2006.01) | |
| *C03C 23/00* | (2006.01) | |
| *C03C 27/10* | (2006.01) | |
| *G01N 27/406* | (2006.01) | |
| *G01N 27/413* | (2006.01) | |

(52) U.S. Cl.
CPC .......... *C03C 17/06* (2013.01); *C03C 23/0025* (2013.01); *C03C 27/10* (2013.01); *G01N 27/4062* (2013.01); *G01N 27/413* (2013.01); *C03C 2217/254* (2013.01)

(56) References Cited

U.S. PATENT DOCUMENTS

| | | |
|---|---|---|
| 7,279,112 B2 | 10/2007 | Martinez |
| 8,795,484 B2 | 8/2014 | Stetter et al. |
| 8,853,798 B2 | 10/2014 | Merz |
| 9,278,886 B2 | 3/2016 | Boek et al. |
| 9,321,680 B2 | 4/2016 | Chuang et al. |
| 9,517,963 B2 | 12/2016 | Marjanovic et al. |
| 10,293,436 B2 | 5/2019 | Marjanovic et al. |
| 2006/0141469 A1 | 6/2006 | Rossier et al. |
| 2007/0138027 A1 | 6/2007 | Dinsmoor et al. |
| 2013/0032902 A1 | 2/2013 | Merz |
| 2013/0293482 A1 | 11/2013 | Burns et al. |
| 2014/0116091 A1 | 5/2014 | Chuang et al. |
| 2014/0202856 A1* | 7/2014 | Roxhed .............. G01N 27/4045 216/18 |
| 2015/0346138 A1 | 12/2015 | Allen et al. |
| 2016/0079149 A1 | 3/2016 | Yoshida |
| 2018/0029924 A1 | 2/2018 | Inoue et al. |

FOREIGN PATENT DOCUMENTS

| | | | |
|---|---|---|---|
| EP | 1959253 A2 | 8/2008 | |
| EP | 2554980 A1 | 2/2013 | |
| GB | 2332528 A | 6/1999 | |
| KR | 10-2009-0026881 A | 3/2009 | |
| TW | 201702201 A | 1/2017 | |
| WO | 2014/205395 A1 | 12/2014 | |
| WO | 2015/100056 A1 | 7/2015 | |
| WO | 2016/015028 A1 | 1/2016 | |
| WO | WO 2017099963 A1 * | 6/2017 | ........... G01N 27/407 |

OTHER PUBLICATIONS

Akartuna et al., slide deck entitled "Ceramic Materials—Chapter 5: Glass" for a Materials Science II lecture presented at the ETH-Zurich; chromextension://efaidnbmnnnibpcajpcglclefindmkaj/https://www.nonmet.mat.ethz.ch/education/courses/Materialwissenschaft_1/Downloads_HS_2007/slides_chapter_5.pdf (Year: 2007).*

Chinese Patent Application No. 201880043627.1, Office Action dated Apr. 27, 2022, 5 pages (English Translation Only), Chinese Patent Office.

Choi et al; "a Microchip Electrochemical Immunosensor Fabricated Using Micromachining Techniques"; Proceedings of the 19th Annual Internaitonal Conference of the IEEE/EMBS."Magnificent Milestones and Emerging Opportunities in Medical Engineering"; (Cat. No. 97CH36136); pp. 2264-2266; vol. 5, 1997.

Gatty et al; "a Wafer-Level Liquid Cavity Integrated Amperometric Gas Sensor With PPB-Level Nitric Oxide Gas Sensitivity"; Journal of Micromachanics and Microengineering; vol. 25, No. 10, 105013;(2015); pp. 1-10.

International Search Report and Written Opinion of the International Searching Authority; PCT/US2018/029732; dated Jul. 5, 2018; 15 Pages; European Patent Office.

Wong et al; "Fabrication of Self-Sealed Circular Nano/Microfluidic Channels in Glass Substrates"; Nanotechnology, vol. 18, No. 13, (2007); pp. 1-6.

* cited by examiner

GLASS ELECTROCHEMICAL SENSOR WITH WAFER LEVEL STACKING AND THROUGH GLASS VIA (TGV) INTERCONNECTS

CROSS-REFERENCE TO RELATED PATENT APPLICATIONS

This application is a divisional application of and claims priority to U.S. patent application Ser. No. 16/608,500, filed on Oct. 25, 2019, which claims the benefit of priority under 35 U.S.C. § 371 to International Patent Application No. PCT/US2018/029732, filed on Apr. 27, 2018, which in turn, claims the benefit of priority under 35 U.S.C. § 119 of U.S. Provisional Application Ser. No. 62/491,408 filed on Apr. 28, 2017, the contents of each of which are relied upon and incorporated herein by reference in their entireties.

BACKGROUND

The deployment of mobile, low cost sensors in phones, tablets, automobiles, healthcare products, and many consumer products is a global technology mega-trend that is attracting major investment in developing miniaturized, low cost designs of many existing sensor technologies. Sensors such as accelerometers, gyroscopes, microphones, cameras, and light sensors are manufactured in tens of millions of units per month in form factors that are compatible with mobile devices and consumer electronics. These sensors are typically produced having dimensions of just a few square millimeters, and are typically very low cost Mobile phones and other personal mobile electronics are driving this market along with the integration of sensors in many new and existing products such as home appliances, wearable health monitors, and industrial equipment. This connected sensor deployment is a global mega-trend known as "The Internet of Things" (IoT).

Electrochemical sensors are an important subclass of chemical sensors. These devices may be used to sense a broad range of chemicals, ranging from toxic gases to biological compounds. These devices function by monitoring changes in conductivity, potential, or current between electrodes in a cell containing an electrolyte. Typically electrochemical sensors have a working electrode, a counter electrode, and a reference electrode, all immersed in an electrolyte.

SUMMARY

The present disclosure is directed to a method for forming a glass electrochemical sensor. In some embodiments, the method may include forming a plurality of electrical through glass vias (TGVs) in an electrode substrate; filling each of the plurality of electrical TGVs with an electrode material; forming a plurality of contact TGVs with a conductive material; patterning the conductive material to connect the electrical TGVs with the contact TGVs; forming a cavity in a first glass plate; and bonding a first side of the first glass plate to the electrode substrate.

In some embodiments, the method may further include bonding a second side of the first glass plate to a second glass plate. In some embodiments, the second glass plate may be solid, such that the cavity in the first glass plate is sealed by glass on three sides.

In some embodiments, bonding the first glass plate to the electrode substrate and bonding the first glass plate to the second glass plate may include bonding the first glass plate, the electrode substrate, and the second glass plate using at least one of adhesive, glass frit, thermal bonding such as laser sealing, or a combination thereof.

In some embodiments, the method may further include coupling the bonded first glass plate and second glass plate to a printed circuit board configured to detect a change in conductivity, potential, or current between electrodes indicating a detectable concentration of a gas entering the cavity in the first glass plate.

In some embodiments, the plurality of electrical TGVs may be positioned around a center of the electrode substrate, and the plurality of contact TGVs may be positioned around a periphery of the electrode substrate.

In some embodiments, at least one of forming the plurality of electrical TGVs and forming the plurality of contact TGVs may include forming the plurality of TGVs with a laser, and defining the plurality of TGVs with an acid etch.

In some embodiments, at least one of the first glass plate and the second glass plate may include a glass wafer.

In some embodiments, the electrode material may include a noble metal which may include one of platinum, gold, or a combination thereof.

In some embodiments, the conductive material may include any of copper, gold, aluminum, a conductive polymer, or a combination thereof.

In some embodiments, filling each of the plurality of contact TGVs with the conductive material may include filling the electrode TGVs by any of paste-filling, electroplating, physical vapor deposition (PVD) which includes sputtering, thermal and e-beam evaporation, and laser ablation, chemical vapor deposition, atomic-layer deposition, or a combination thereof.

In some embodiments, the first glass plate may include any of Pyrex®, quartz, soda-lime glass, aluminosilicate glass, alkali-aluminosilicate glass, borosilicate glass, alkali-borosilicate glass, aluminoborosilicate glass, alkali-aluminoborosilicate glass, fused silica glass, or any combination thereof.

The present disclosure is also directed to a glass electrochemical sensor having an electrode substrate layer and a first glass plate layer including a cavity. In some embodiments, the electrode substrate layer may be bonded to a first side of the first glass plate layer. In some embodiments, the electrode substrate layer may include a plurality of electrical through glass vias (TGVs), and the plurality of electrical TGVs may be filled with an electrode material.

In some embodiments, the electrochemical sensor may further include a conductive material redistribution layer (RDL) applied to a surface of the electrode substrate layer.

In some embodiments, the electrode substrate layer may further include a plurality of contact TGVs, and the plurality of contact TGVs may be filled with a conductive material. In some embodiments, the conductive material may be patterned to connect the electrical TGVs with the contact TGVs.

In some embodiments, the plurality of electrical TGVs may be positioned around a center of the electrode substrate layer, and the plurality contact TGVs may be positioned about a periphery of the electrode substrate layer.

In some embodiments, the glass electrochemical sensor may further include a second glass plate layer. In some embodiments, the second glass plate layer may b e bonded to a second side of the first glass plate layer, and the second glass plate layer may b e solid, such that the cavity in the first glass plate can be sealed by glass on at least the bottom, all sides, and a portion of the top.

In some embodiments, the second glass plate layer may be bonded to the first glass plate layer by at least one of adhesive, glass frit, laser sealing, or a combination thereof.

In some embodiments, the bonded first glass plate layer and the second glass plate layer may be coupled to a printed circuit board, configured to detect a change in conductivity, potential, or current between electrodes indicating a detectable concentration of a gas entering the cavity in the first glass plate layer.

The present disclosure is further directed to an electronic device including the glass electrochemical sensor as previously recited.

One or more representative embodiments is provided to illustrate the various features, characteristics, and advantages of the disclosed subject matter. The embodiments are provided in the context of glass electrochemical sensors. It should be understood, however, that many of the concepts may be used in a variety of other settings, situations, and configurations. For example, the features, characteristics, advantages, etc., of one embodiment may be used alone or in various combinations and sub-combinations with one another.

The Summary is provided to introduce a selection of concepts in a simplified form that are further described below in the Detailed Description. The Summary and the Background are not intended to identify key concepts or essential aspects of the disclosed subject matter, nor should they be used to constrict or limit the scope of the claims. For example, the scope of the claims should not be limited based on whether the recited subject matter includes any or all aspects noted in the Summary and/or addresses any of the issues noted in the Background.

BRIEF DESCRIPTION OF THE DRAWINGS

The preferred and other embodiments are disclosed in association with the accompanying drawings in which:

FIG. 10a illustrates the example TGV placement lay out with die level layout, and FIG. 10b illustrates the example TGV placement lay out with 692 die per wafer;

DETAILED DESCRIPTION

The present system includes a design for a glass-based electrochemical cell for chemical and biochemical sensing systems including, but in no way limited to, an air quality sensor for mobile consumer electronic applications. Smaller devices enable incorporation in IOT applications like smart phones, wearables, automobiles, home security monitoring, and appliances, to name a few. Miniaturization of these devices makes use of glass as a material an attractive option due to its chemical durability, dimensional tolerances, coefficient of thermal expansion (CTE) match to silicon, temperature stability, and low gas permeability.

Figure 1:
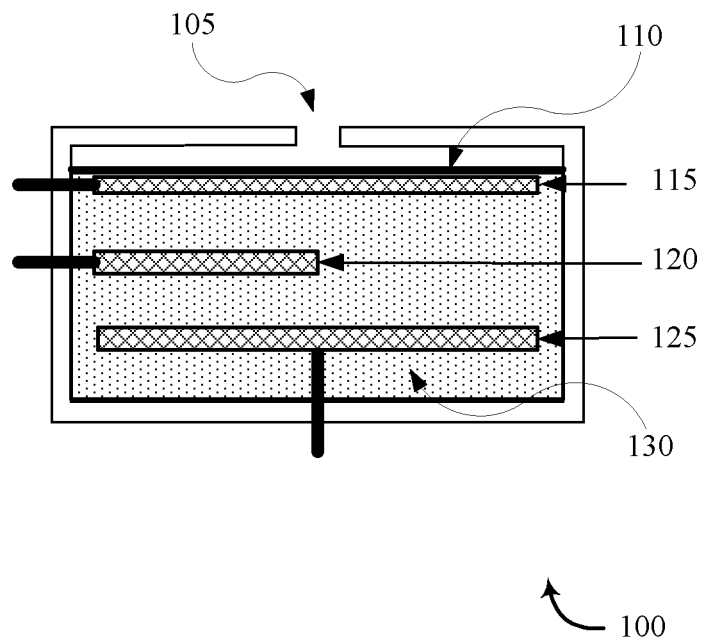
FIG. 1 is a cross-sectional view of an example of the elements of a conventional electrochemical sensor.

The present disclosure relates to methods of forming a glass electrochemical sensor. FIG. 1 shows a cross-section of the basic elements of a traditional electrochemical sensor 100. As shown in FIG. 1, the traditional electrochemical sensor 100 may include a capillary diffusion barrier 105, a hydrophobic membrane 110, a working or sensing electrode 115, a reference electrode 120, a counter electrode 125, and an electrolyte 130. This traditional electrochemical sensor 100 is typically packaged in a polymer.

According to one embodiment of the traditional electrochemical sensor 100, the hydrophobic membrane 110 or gas permeable membrane is used to cover the sensor's electrode and control the amount of gas molecules reaching the electrode surface. The gas permeable membrane may be made of any number of Teflon membranes having varying porosity, depending on the desired application. In one embodiment, the hydrophobic membrane 110 also prevents liquid electrolyte from leaking out or drying out the sensor too quickly.

The electrolyte 130 facilitates the cell reaction and carries the ionic charge across the electrodes efficiently. Further the electrolyte forms a stable reference potential with the reference electrode and can be compatible with the materials used within the sensor. Premature evaporation of the electrolyte will result in premature signal deterioration. The electrolyte may be selected based on the chemical reactivity of the target gas and may include, but is in no way limited to, a mineral acid or an organic electrolyte.

The working or sensing electrode 115 is formed of a catalyzed material which performs the half-cell reaction over along period of time. Typically, the electrode is made from a noble metal, such as platinum or gold, and is catalyzed for an effective reaction with gas molecules. Depending on the design of the sensor, all three electrodes (115, 120, 125) may be made of different materials to complete the cell reaction.

In operation, a gas may enter the traditional electrochemical sensor 100 through the capillary diffusion barrier 105, where the gas may come into contact with the sensing or working electrode 115. The traditional electrochemical sensor 100 may then measure the concentration of the gas by oxidizing or reducing the gas at the sensing electrode 115 and measuring the resulting current. At the counter electrode 125, an equal and opposite reaction occurs, such that if the sensing electrode 115 is an oxidation, the counter electrode 125 is a reduction. An external circuit (not shown) maintains the voltage across the traditional electrochemical sensor 100 between the sensing electrode 115 and the counter electrode 125, and between the sensing electrode 115 and the reference electrode 120.

In contrast to the traditional electrochemical sensor 100 illustrated in FIG. 1, which is traditionally packaged in polymer, the present exemplary system and method provides for a miniaturized glass electrochemical cell. According to this exemplary method, precision laser technologies are used to form high throughput compatible through glass vias (TGVs), also called "vias" herein, and larger structural glass cavities with tight dimensional tolerances in glass wafers. The vias can be formed by the methods taught in, for example, International Pat. App. No. PCT/US2014/070459; U.S. Pat. No. 9,278,886; and (3) U.S. Pat. No. 9,321,680, which references are incorporated herein by reference for all that they disclose. The vias can be formed to extend through a layer of glass, from one surface to another. The formation of vias that extend from a first surface of a layer of glass to another surface of a layer of glass enable the embedding of conductors to facilitate conductivity with appropriate electrodes within the cavity while providing electrical leads to a surface outside the cavity. The exemplary process enables miniaturization of the components, reducing their cost and facilitating their adoption into mobile or IoT applications. Furthermore, as will b e detailed below, the present exemplary system and method provide for enhanced temperature stability, chemical durability, easy surface modification and functionalization, and may be incorporated into wafer-scale processing.

Figure 2:
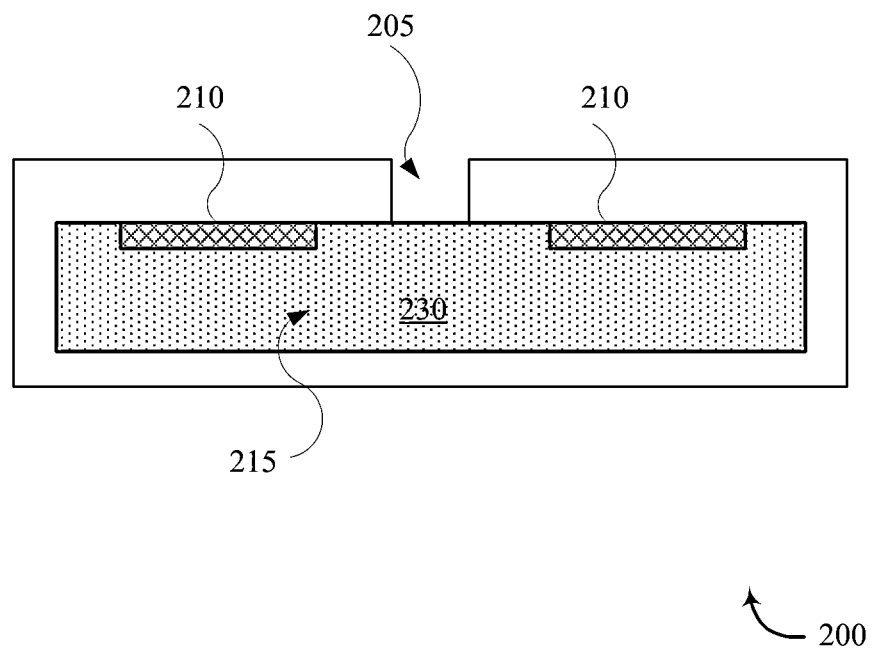
FIG. 2 is a cross-sectional view of an example glass-based electrochemical sensor.

FIG. 2 is a cross-section diagram showing an exemplary high-level design of a miniature glass-based electrochemical sensor 200, according to the present disclosure. In the illustrated example, cavity 215 is contained within a glass article, with an aperture 205 to facilitate gas transmission into the cavity 215. Within the cavity 215 is an electrolyte 230 and electrodes 210. FIG. 2 shows possible locations within the cavity 215 for the electrodes 210, but is not intended to be limiting as to the locations or number of electrodes 210 utilized. Rather, FIG. 2 illustrates how electrical connections may be formed to facilitate electrical connection between the electrodes 210 and the outside of the glass article. Design and placement of the electrodes 210 may vary depending on the desired characteristics and sensitivity of the glass-based electrochemical sensor 200. However, as illustrated in FIG. 2, placement of the electrodes on the cavity 215 of the glass article presents a need for through glass vias (TGVs) to minimize the glass/metal interface thereby minimizing leakage of the electrolyte.

Figure 3:
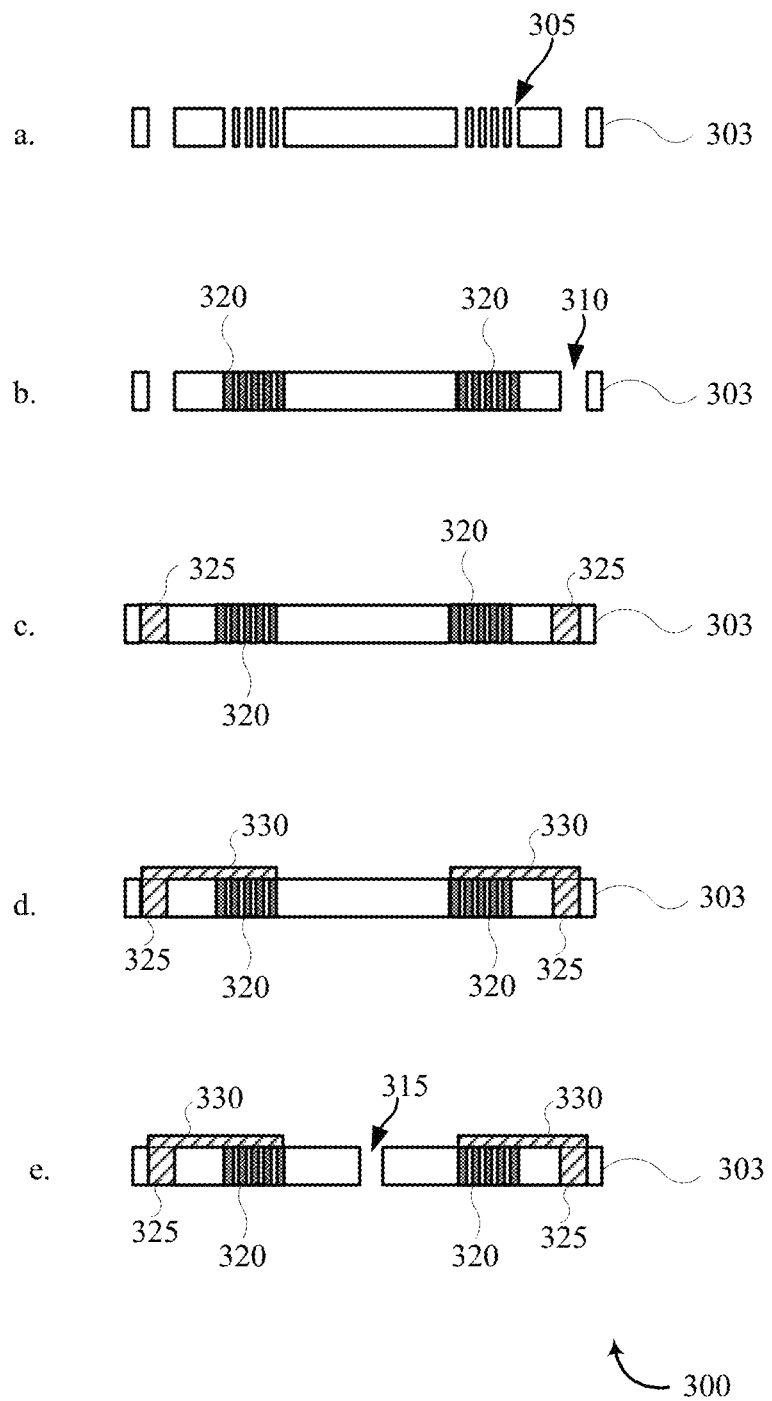
FIG. 3 is an example method for formation of a glass electrochemical sensor with wafer level stacking and through glass via (TGV) interconnects.
Figure 4:
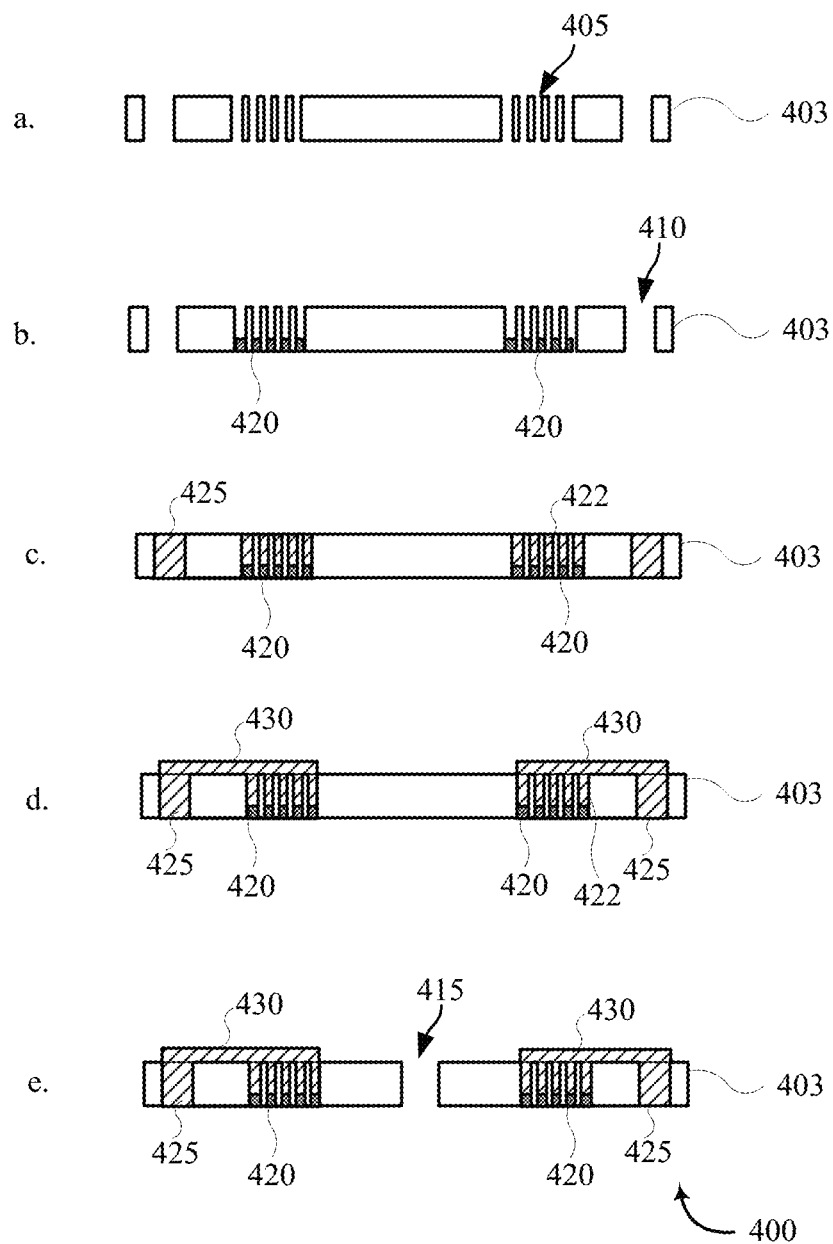
FIG. 4 is an alternate example method for formation of a glass electrochemical sensor with wafer level stacking and TGV interconnects.
Figure 5:
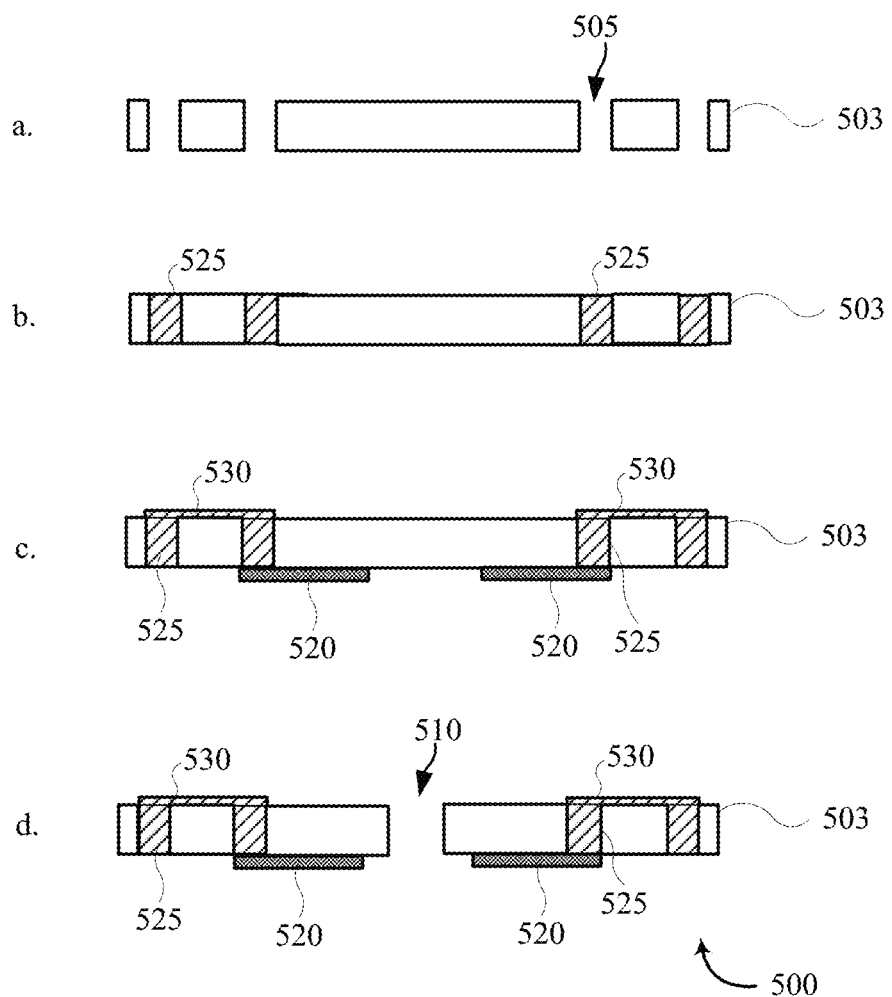
FIG. 5 is an alternate example method for formation of a glass electrochemical sensor with wafer level stacking and TGV interconnects.

FIGS. 3-5 illustrate a cross-sectional view of a glass sheet having vias formed therein. FIGS. 3-5 illustrate various methods for forming the desired through glass vias in the glass sheet. While the glass sheet 303, 403, 503 illustrated in FIGS. 3-5 is shown as a single layer of glass, the glass sheet could be any number of structures including, but in no way limited to, a laminate of several sheets of glass joined or bonded together. The laminate may include one or more interlayers between the glass sheets including, but not limited to polyvinyl butyral (PVB), polycarbonate, acoustic PVB, ethylene vinyl acetate (EVA), thermoplastic polyurethane (TPU), an ionomer, a thermoplastic material, or combinations thereof.

FIG. 3 is an example method 300 for formation of the desired through glass vias in the upper layer of the glass-based electrochemical sensor. As mentioned, the use of through glass vias (TGVs) that extend from a first surface of a glass layer to a second surface of the glass layer facilitates the connection between the top or bottom surface of the glass sensor and the electrodes, while minimizing the glass/metal interface, thereby minimizing the potential for leaking of the electrolyte 230. According to the exemplary method 300, a glass sheet 303 acting as an electrode substrate may be patterned to form a plurality of TGVs (step a). In some examples, the TGVs may be formed in a sheet of glass using a laser system. According to one embodiment described below, some of the TGVs formed may be dimensioned and positioned to serve as electrode TGVs 305, while others may be dimensioned and positioned to serve as contact TGVs 310. As illustrated in FIG. 3, the electrode TGVs 305 have a smaller diameter than the contact TGVs 310. However, the relative size between the contact TGVs 310 and the electrode TGVs 305 may vary. Depending on the intended use of the resulting patterned glass, one or more of the exemplary contact TGVs 310 and electrode TGVs 305 may be formed on the glass. As shown herein, for use as an electrochemical sensor, at least two electrode TGVs 305 and at least two contact TGVs 310 are formed to allow for a sensing and counter electrode.

As shown in FIG. 3, once the glass sheet 303 is patterned with at least two electrode TGVs 305 and at least two contact TGVs 310, the plurality of electrode TGVs 305 may be metallized by being at least partially filled with an electrode material 320. While described herein as being at least partially filled with an electrode material 320, other methods for metallizing the electrode TGVs may be used including, but in no way limited to, a conformal metal coating to provide the conductive path and then hermetically sealing the via with a polymer fill material. As used herein, the term "electrode material" refers to a material used to form the electrode in the present glass-based electrochemical sensor. The electrode material 320 is typically a corrosion and oxidation resistant material that can be used to act as an electrode while maintaining a hermetic seal with the glass layer. The electrode material 320 may be made of a noble metal including, but in no way limited to, platinum, silver, gold, or combinations thereof (step b). In other embodiments where corrosion and oxidation are less sensitive, or the useful life of the sensor is less, other metals such as copper, or combinations of metals can be used to form the electrode material. Furthermore, if the resulting glass-based electrochemical sensor is to be used for biological applications, the sensor may be made of a self-assembled monolayer (SAM) or a material having bound functionalities on the metal electrodes.

Figure 7:
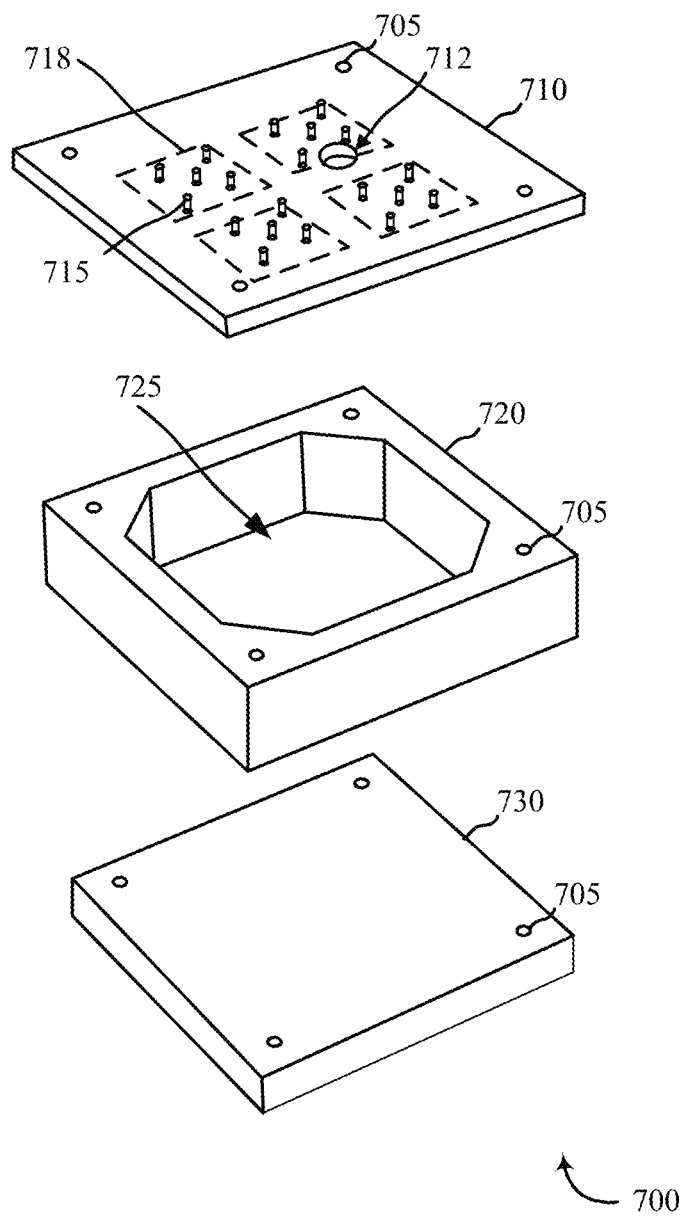
FIG. 7 is an exploded view of an example glass electrochemical sensor with wafer level stacking and TGV interconnects.
Figure 8:
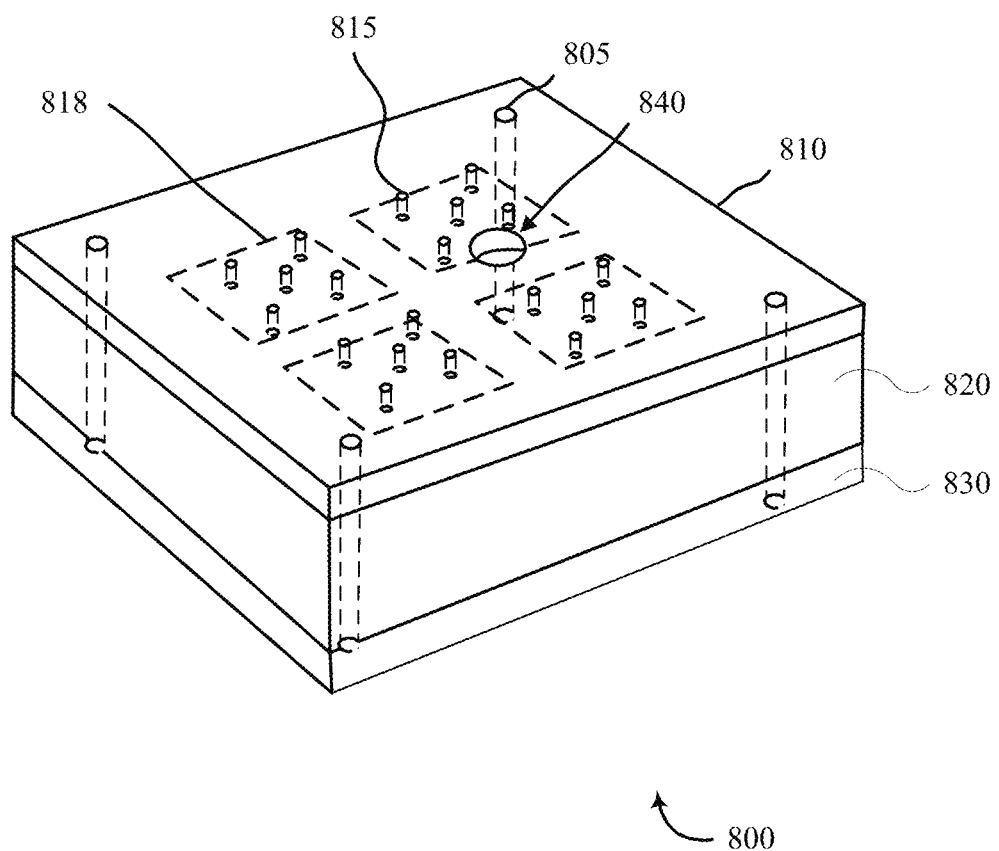
FIG. 8 is a perspective view of an example glass electrochemical sensor with wafer level stacking and TGV interconnects.

Once the electrode TGVs 305 are metallized or otherwise hermetically sealed, the plurality of contact TGVs 310 are at least partially filled with a conductive material 325. Conductive material 325 may include copper, gold, aluminum, silver, platinum, tin, lead, a conductive polymer, or combinations thereof (step c). Copper or another conductive material may be added to form a connection bridge 330 between the material in the electrode TGVs 305 and the material in the contact TGVs 310 (step d), which will subsequently be connected to a printed circuit board (PCB) or other processing interface. According to one embodiment, the material added to form the connection bridge 330 may include, but is in no way limited to, copper, gold, aluminum, silver, platinum, tin, lead, a conductive polymer, or combinations thereof. A hole 315 may be formed through the glass sheet to define the gas sensing port for the miniature glass-based electrochemical sensor 200 (step e). In some examples, the hole 315 may have a diameter of about 400 µm, or about 300 µm, or about 200 µm, or about 100 µm or less, including all ranges therebetween; in other examples, the hole 315 may have a diameter of some other suitable size. According to one exemplary embodiment, the hole 315 is sized such that the electrolyte 230 is maintained in the cavity 215 of the miniature glass-based electrochemical sensor 200 via capillary action. Alternatively, the electrolyte may be maintained in the cavity by a hydrophobic or gas permeable membrane (not shown) adjacent hole 315. Once formed and metallized, the glass sheet may subsequently be bonded to one or more lower glass plate(s) having a cavity therein, as illustrated in FIGS. 7 and 8, in order to form the glass-based electrochemical sensor 200, which may then be electrically coupled to a PCB or other processing interface.

In another embodiment, illustrated in FIG. 4, an alternate method 400 for formation of a glass-based electrochemical sensor may be used, in which less precious metal is needed to form the sensor, when compared to the method of FIG. 3. According to the exemplary method 400 illustrated in FIG. 4, a glass sheet 403 acting as an electrode substrate may be patterned to form a plurality of TGVs (step a), similar to the method illustrated in FIG. 3. In some examples, the TGVs may be formed in glass sheet 403 using a laser system. Formation of the TGVs may be performed by a laser ablation or a laser damage process to localized areas on glass sheet 403, optionally followed by etching of the localized areas, if needed, to remove the ablated or damaged material to form the TGVs. Some of the TGVs formed may be electrode TGVs 405, while others may be contact TGVs 410. Once patterned, the plurality of electrode TGVs 405 are at least partially filled with an electrode material 420. The electrode material 420 is typically a corrosion and oxidation resistant material that can be used to act as an electrode while maintaining a hermetic seal with the glass layer. The electrode material 420 may be made of a noble metal including, but in no way limited to, platinum, silver, gold, or combinations thereof (step b).

As shown in FIG. 4, less electrode material is deposited in each electrode via 405, when compared to the method of FIG. 3. Following the at least partial filling of the electrode TGVs 405 with electrode material 420, the remaining volume of the plurality of electrode TGVs 405 and the plurality of contact TGVs 410 are at least partially filled with a conductive material 422, 425, such as copper, gold, aluminum, silver, platinum, tin, lead, a conductive polymer, or combinations thereof (step c). Copper or another conductive material may then be added to form a connection bridge 430 between the material in the electrode TGVs 405 and the material in the contact TGVs 410 (step d). According to one embodiment, the material added to form the connection bridge 430 may include, but is in no way limited to, copper, gold, aluminum, silver, platinum, tin, lead, a conductive polymer, or combinations thereof. Furthermore, while the present method is described as at least partially filling the plurality of electrode TGVs 405 and the plurality of contact TGVs 410, and forming the connection bridge 430 with a conductive material 422, 425 in separate steps, the partial filling of the electrode TGVs 405 and the plurality of contact TGVs 410, as well as the formation of the connection bridge 430 can be performed in a single step with the same or different material.

A hole 415 may be formed through the glass sheet to define the gas sensing port for the miniature glass-based electrochemical sensor 200 (step e). In some examples, the hole 415 may have a diameter of about 400 µm, or about 300 µm, or about 200 µm, or about 100 µm or less, including all ranges therebetween; in other examples, the hole 415 may have a diameter of some other suitable size. The glass sheet 403 may subsequently be joined to a lower glass plate or plates having a cavity therein, in order to form the glass-based electrochemical sensor 200, which may then be electrically coupled to a PCB or other processing interface.

FIG. 5 is an example of yet another alternate method 500 using TGVs for the formation of electrodes on a glass substrate that can then be used to form a glass-based electrochemical sensor. According to the method 500 illustrated in FIG. 5, a glass sheet 503 acting as an electrode substrate may be patterned to form a plurality of TGVs (step a). In some examples, the TGVs may be formed in a glass sheet 503 using a laser system and applicable methods as described above. In the illustrated embodiment, the TGVs may include electrode TGVs 505. Once formed, the plurality of electrode TGVs 505 are at least partially filled with a plug of a conductive material 525, such as copper, gold, aluminum, a conductive polymer, or combinations thereof (step b). In some embodiments the electrode vias TGVs may be at least partially filled with a conductive metal, typically copper or silver, deposited by electroless or electroplating, or physical vapor deposition (PVD) which includes sputtering, thermal and e-beam evaporation, and laser ablation methods, or it may be a conductive paste deposited by silk screen, doctor blade, or ink jet printing. Conductive pastes include metal pastes which contain a majority of metal such as copper, platinum, or silver along with solder glass, binder and organic solvents. Alternatively the paste may comprise a low melting solder such as Sn—Pb, Sn—Ag—Cu or Sn—Sb. Alternatively metal (typically Ag or Cu) filled polymer pastes may also be used. The holes may then be planarized to smooth the surfaces with any combination of chemical and mechanical forces. Additionally, copper or some other conductive material may be added to form a connection bridge 530 between the material in the electrode TGVs 505 on a first side of the glass sheet 503, and an electrode material 520, such as platinum that, may be deposited on a second side of the glass sheet 503, as described above (step c). With the electrode material formed, a hole 510 may be formed through the glass sheet 503 (step d). In some examples, the hole 510 may have a diameter of 400 µm, or about 300 µm, or about 200 µm, or about 100 µm or less, including all ranges there between; in other examples, the hole 510 may have a diameter of some other suitable size. The glass sheet 503 may subsequently be bonded to a lower glass plate or plates having a cavity therein, in order to form the glass-based electrochemical sensor.

While the present exemplary systems and methods have been described in FIGS. 3-5 as forming the electrodes and contacts in the top portion of the electrochemical sensor, any number of access points and orientations may be achieved by the present systems and methods to be incorporated into an electrochemical sensor, including a bottom or side placement of the electrodes and/or contacts on the glass sheet 303, 403, 503.

Figure 6:
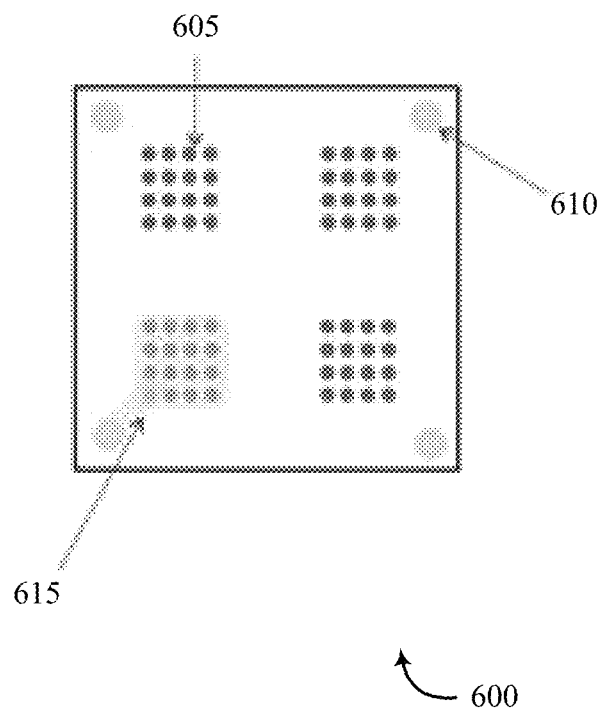
FIG. 6 is a top view of an example glass electrochemical sensor with wafer level stacking and TGV interconnects.

FIG. 6 is a top view of an exemplary glass-based electrochemical sensor plate 600, according to one embodiment. As illustrated, the glass-based electrochemical sensor plate 600 may include a plurality of platinum or other electrode material-filled electrode TGVs 605, and a plurality of copper or other conductive material-filled contact TGVs 610. The plurality of electrode TGVs 605 may be connected to the plurality of contact TGVs 610 with a plurality of copper pads or traces forming a connection bridge 615. The plurality of copper pads or traces that make up the connection bridges 615 form a redistribution layer (RDL), used to route connectivity to a printed circuit board or other electrical circuit. The glass-based electrochemical sensor plate 600 may be bonded to a lower glass plate having a cavity therein, in order to form the glass-based electrochemical sensor. The illustrated electrode TGVs 605 and contact TGVs 610 may be formed according to any of the exemplary methods illustrated in FIGS. 3-5 detailed above.

FIG. 7 is an exploded perspective view of a glass-based electrochemical sensor 700, according to one exemplary embodiment. As shown, the glass-based electrochemical sensor 700 may include three layers: a glass-based electrochemical sensor plate 710, which may be an example of the glass-based electrochemical sensor plate 600 illustrated in FIG. 6; a middle glass layer 720 having a cavity 725 therein; and a bottom glass layer 730. Furthermore, as shown in FIG. 7, the glass-based electrochemical sensor plate 710 may include a plurality of electrode TGVs 715 connected to a plurality of electrodes 718 formed on the underside of the glass-based electrochemical sensor plate 710, and a plurality of contact TGVs 705, which may be examples of electrode TGVs 605 and contact TGVs 610 illustrated in FIG. 6. Each of the three layers 710, 720, 730 may be bonded together to form the glass-based electrochemical sensor 700, and contact TGVs 705 formed in each layer can be connected to transfer a signal to the underside of the bottom glass layer. For ease of explanation, FIG. 7 does not show the plurality of copper pads or traces forming the connection bridge between electrode TGVs 715 and contact TGVs 705 to form the RDL.

FIG. 8 is an assembled perspective view of a glass-based electrochemical sensor 800, according to one exemplary embodiment. As shown, the glass-based electrochemical sensor 800 may be an example of the glass-based electrochemical sensor 700, illustrated in FIG. 7. Again, for illustrative purposes, the plurality of copper pads or traces between electrode TGVs 815 and contact TGVs 805 are not shown. The glass-based electrochemical sensor 800 may be formed of three layers, including a sensor plate 810, a middle glass layer 820 having a cavity therein, and a bottom glass layer 830. The sensor plate 810 can include a plurality of electrode TGVs 815 that extend from the top surface of the sensor plate to a number of electrodes 818 formed on the underside of the sensor plate 810 where they are exposed to the cavity (not shown) formed in the middle glass layer 820. Additionally, the sensor plate 810 can include contact TGVs 805 that extend through from the top surface of the sensor plate 810, through the middle glass layer 820, and to the bottom surface of the bottom glass layer 830 where they can then be attached to a PCB or other processing interface.

In an alternate embodiment, rather than placing the plurality of filled electrode and contact vias in the top sensor plate 810, the vias could instead be formed on the bottom glass layer 830. This configuration would eliminate the need for the contact TGVs 805. In this alternate embodiment, an RDL would be applied to the underside of the bottom glass layer. A gas port 840 is then be added to the top sensor plate 810 to allow gas into the cavity and into contact with the plurality of electrode vias in the bottom glass layer. While FIGS. 7 and 8 are described as forming the glass-based electrochemical sensor 800 from 3 separate glass layers, the exemplary glass-based electrochemical sensor 800 may be formed from two separate glass layers if the bottom layer is a single glass layer having an appropriate cavity formed therein, which cavity may be formed by a laser ablation or a laser damage process to localized areas on the top sensor plate 810, optionally followed by etching of the localized areas, if needed, to remove the ablated or damaged material to form the TGVs.

Figure 9:
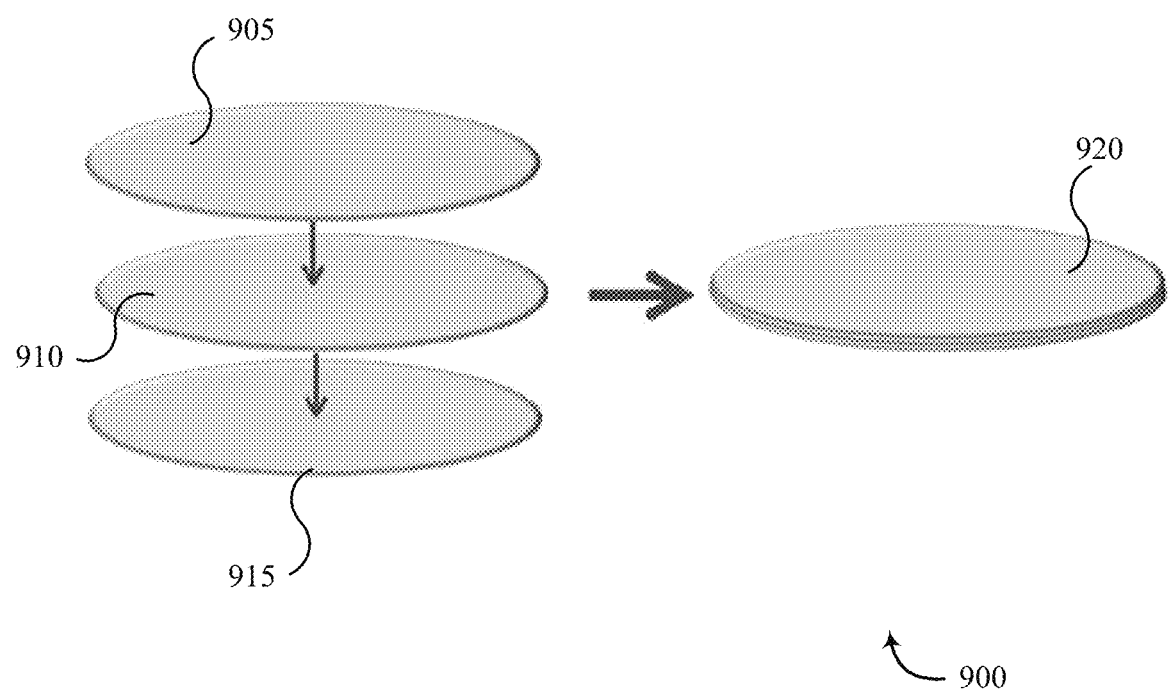
FIG. 9 is an example method for wafer-level processing and formation of a three-layer stack.

FIG. 9 is an illustration of an example of a wafer-level processing method 900 for forming a three-layer stack. As illustrated in FIG. 9, a glass lid 905, a glass interposer layer 910, and a bottom glass layer 915 may be bonded together to form a sealed stack 920. In some examples, the bonding may be accomplished using an adhesive if the chemistry is chemically compatible, glass frit, or by laser sealing. As mentioned above, the electrode TGVs and contact TGVs may be formed, at least partially filled and/or fully metalized in either the glass lid 905, the glass interposer layer 910, and/or the bottom glass layer 915, depending on the sensor design. Once the sealed stack is formed, including the formation of the electrodes and electrical contacts, if formed using wafer-level processing methods, the glass lid 905 will contain a plurality of die sensor layouts, including electrode material 320, 420, 520 (which may be formed into electrodes), conductive material 325, 425, 525 (which may be formed in contacts), and connection bridges 330, 430, 530 for forming a plurality of glass sensors, the glass interposer layer 910 will have a plurality of corresponding cavities, and the bottom glass layer will complete the cavity 215 of each of the now assembled glass-based electrochemical sensors 200. Once assembled, each of the assembled glass-based electrical sensors can be cut or punched out from the sealed stack 920 and electrically connected to a printed circuit board (PCB) or other processing interface, and then for use in an electronic device. Example electronic devices include, but are in no way limited to, smart phones, wearables, automobiles, home security monitoring, TSA monitoring devices, emissions sensors, cabin air quality sensors, indoor air quality sensors, and standard appliances, to name a few.

Figure 10A:
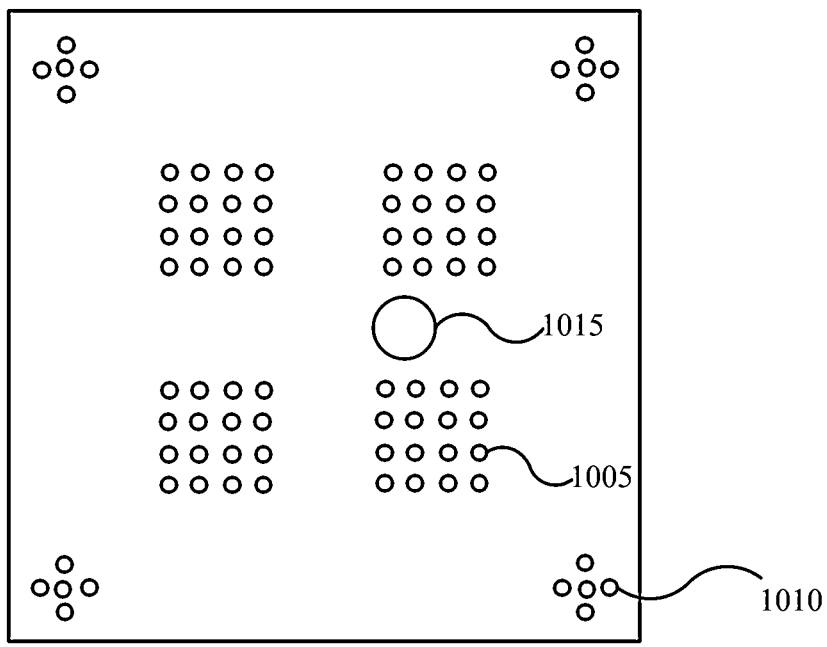
FIGS. 10a and 10b illustrate an example TGV placement layout for a four electrode glass-based electrochemical sensor.
Figure 10B:
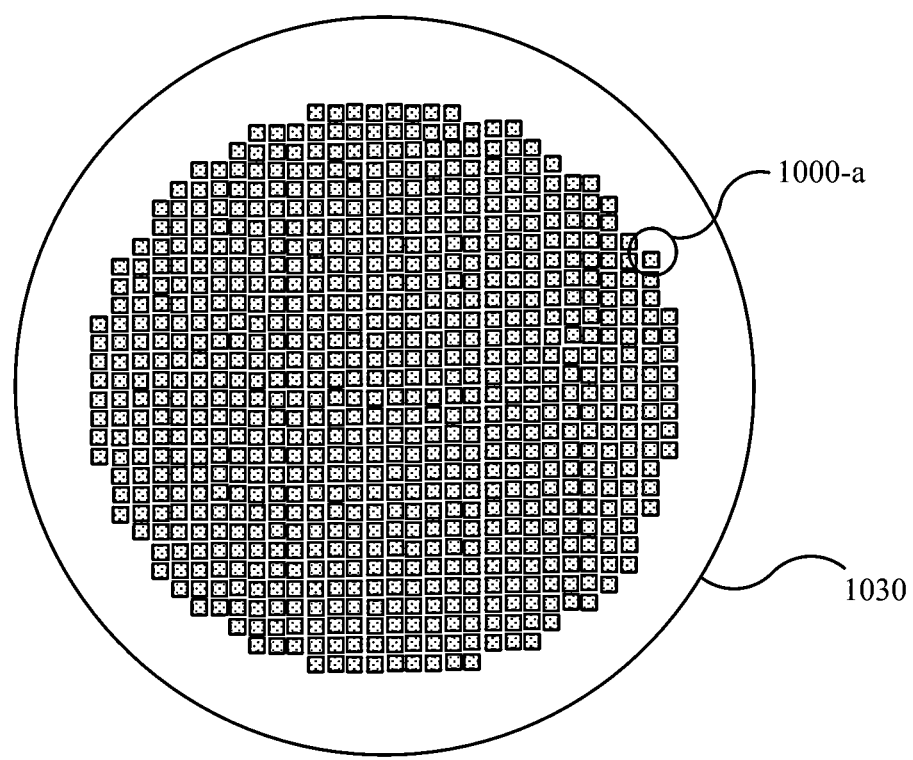

FIGS. 10a and 10b illustrate an example TGV placement for a four-electrode glass-based electrochemical sensor. More specifically, FIG. 10a illustrates a die level lay out 1000-a of the electrochemical sensor. As is illustrated in FIG. 10a, the die level layout includes a number of contact TGVs 1010, electrode TGVs 1005, and a gas port 1015. FIG. 10b illustrates a wafer layout 1000-b, having 6102 die level layouts 1000-a per wafer 1030. As is illustrated in FIG. 10b, the present exemplary system and method enable the rapid production of a high volume of glass-based electrochemical sensors. Specifically, one advantage of using glass wafers with laser processing to form the TGVs is the ability to apply wafer-level processing to the manufacturing process, thereby reducing cost and increasing manufacturability.

Figure 11:
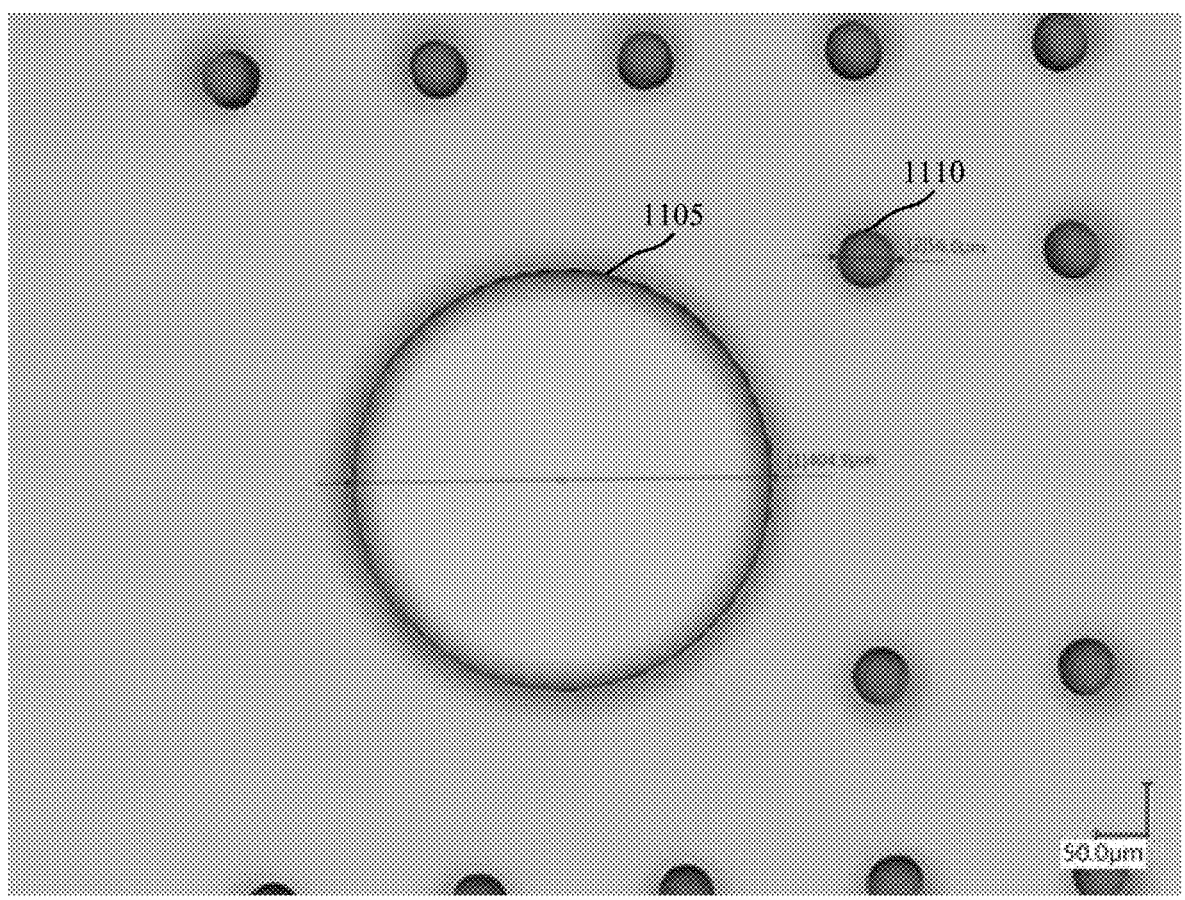
FIG. 11 is a representative image of a fluid hole and TGVs in an example glass electrochemical sensor.

FIG. 11 is an image 1100 of a gas port 1105 and a plurality of TGVs 1110 that were formed in a wafer using laser processing, followed by an acid etch process, as described above. As illustrated in the image of FIG. 11, the gas port 1105 was formed having an about 400 microns diameter, and the plurality of TGVs 1110 were formed having a diameter of approximately 50 microns each. While the gas port 1105 was formed with an about 400 microns diameter and the TGVs 1110 were formed with a diameter of approximately 50 microns, the present exemplary method may be used to form vias and holes in a glass wafer ranging from the diameter of the laser used in the laser ablation or laser damage process, to a centimeter or more.

Figure 12:
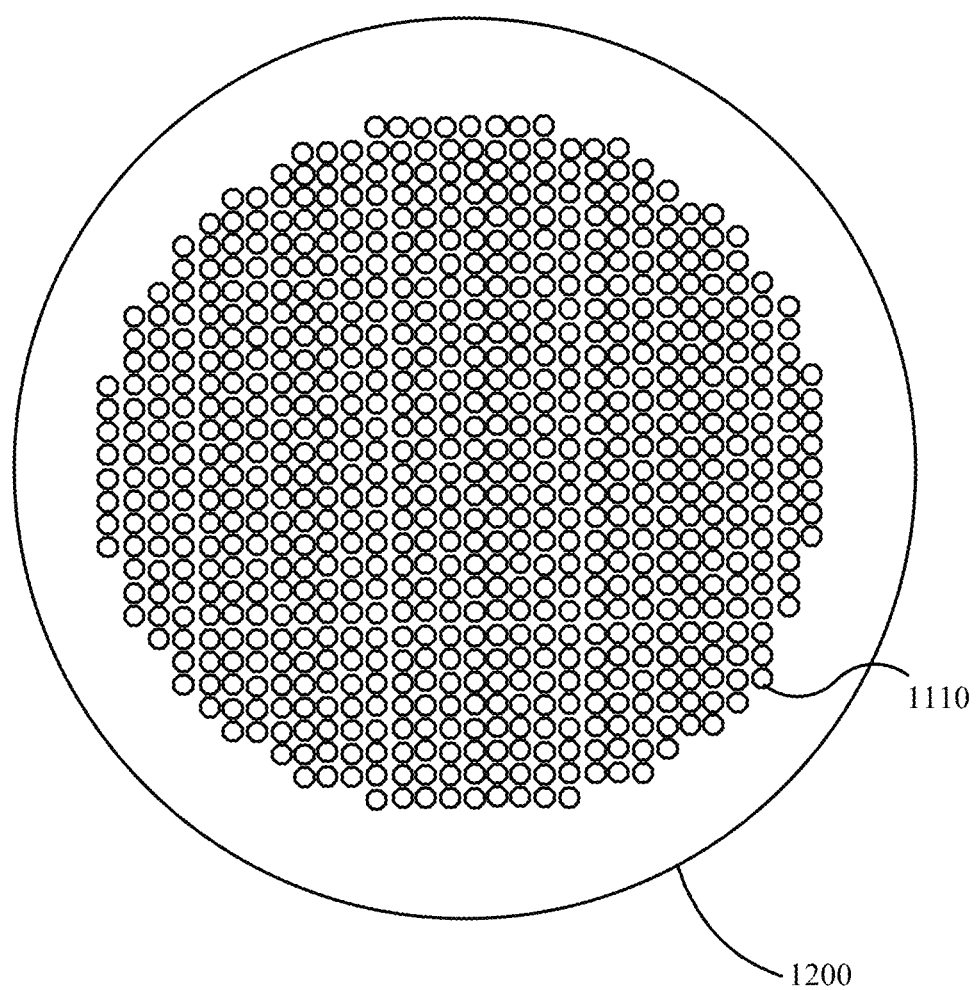
FIG. 12 is a representative image of an interposer wafer layout with octagonal apertures.

FIG. 12 is an illustration of a glass wafer 1200 that was processed with laser processing and acid etch method described herein to form a plurality of TGVs 1210. Glass wafer 1200 may be called a glass interposer layer 910, having a plurality of pockets, either formed through the wafer as TGVs, or only formed partially through the glass wafer 1200, patterned on the surface thereof to serve as the cavity in the assembled sensor. This layer can be used to form the cavity portion of the glass-based electrical sensor, such as that illustrated as 725 in FIG. 7, which may then be joined with an upper layer and a lower layer, as described above, to form the glass-based electrical sensor.

Figure 13:
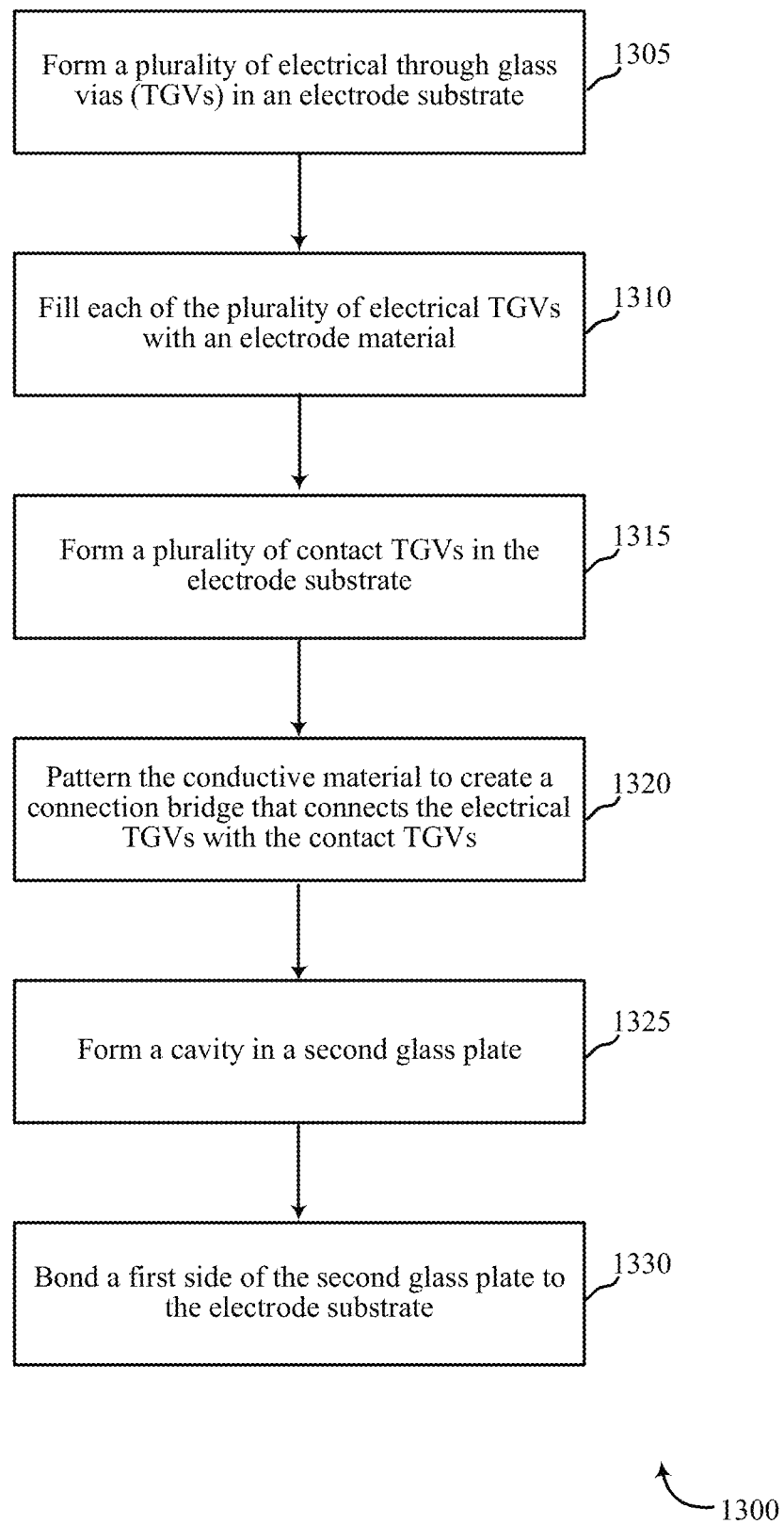
FIG. 13 is a flow chart illustrating an example method for formation of a glass electrochemical sensor with wafer level stacking.

FIG. 13 is an exemplary method 1300 for forming a glass-based electrochemical sensor 200, according to some embodiments of the present disclosure. As illustrated, the method 1300 may include forming a plurality of through glass vias (TGVs) 305, 405, 505 for forming a plurality of electrodes in a glass sheet 303, 403, 503 that will serve as an electrode substrate, as described above (step 1305). Once the electrode TGVs 305, 405, 505 are formed, each of the plurality of electrode TGVs may be filled with an electrode material 320, 420, 520 (step 1310). Additionally, a plurality of contact TGVs 310, 410, 510 may be formed in the glass sheet 303, 403, 503 to facilitate electrical contact between the glass-based electrochemical sensor 200 and a PCB or other processing interface (step 1315). Additional patterning may be performed on the conductive material to form a connection bridge 330, 430, 530 that connects the material in the electrode TGVs 305, 405, 505 with the contact TGVs 310, 410, 510 (step 1320). Once the patterning is complete and the electrode TGVs 305, 405, 505 are in electrical contact with the material disposed in the contact TGVs 310, 410, 510, at least one hole 315, 415, 510 may be formed in the glass substrate (step 1325). When the glass substrate containing the electrodes is formed, according to one exemplary embodiment, a second glass plate may be bonded to the first glass substrate containing the electrodes (step 1330). As noted above, if the second glass plate includes an orifice sealed everywhere except where it will be bonded to the electrode substrate or first glass substrate, a single glass plate can be bonded to the electrode substrate to complete the glass-based electrical sensor. If, however, the second glass plate has one or more through-holes, a third glass plate may be used to seal the through-hole and define the cavity of the glass-based electrical sensor.

Once the first glass plate including the electrodes is bonded to the appropriate glass plates, each resulting glass-based electrical sensor can be separated from the sealed stack, an electrolyte may be inserted into the chamber, and the glass-based electrical sensor may then be electrically connected to a printed circuit board (PCB) or other processing interface, and then assembled with a larger device, including, but in no way limited to, smart phones, wearables, automobiles, home security monitoring, and appliances, to name a few.

Figure 14:
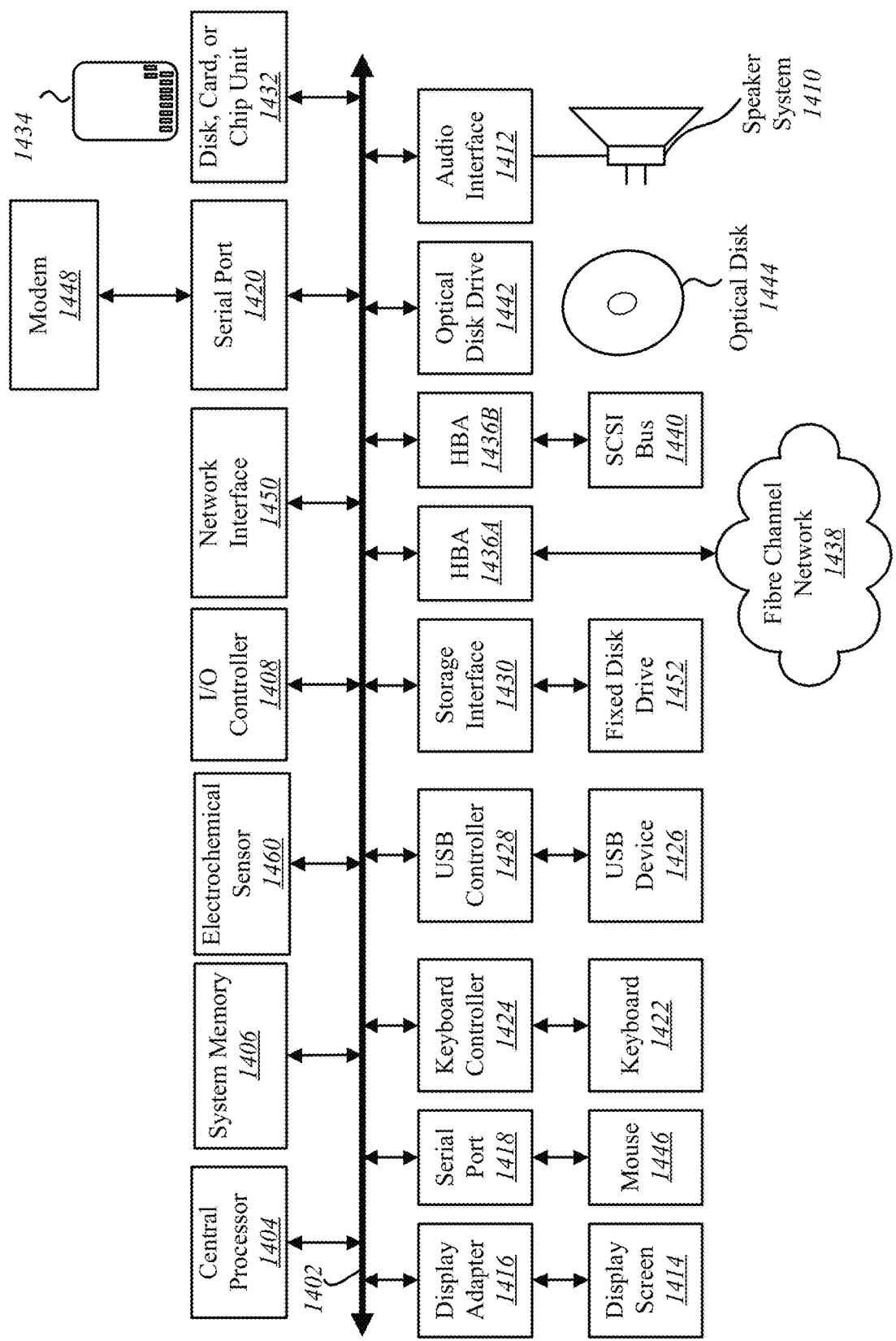
FIG. 14 depicts a block diagram of an example computer system suitable for implementing the present systems and methods.

FIG. 14 depicts a block diagram of a computer system 1400 suitable for implementing the present exemplary glass-based electrical sensor 1460. The depicted computer system 1400 may be one example of a device described above, such as a smart phone, a wearable, an automobile, a home security monitoring system, or another appliance. While described in detail with a number of components, the present exemplary glass-based electrical sensor 1460 can be incorporated into any number of computing systems including all, some, or none of the elements detailed in FIG. 14. Particularly, the present glass-based electrical sensor 1460 can be connected to a system on a chip (SOC) device wherein the functionality of the sensor is associated with the other components on the chip, rather than through a bus or other system.

As shown in FIG. 14, the computer system 1400 includes a bus 1402 which interconnects major subsystems of computer system 1400, such as a central processor 1404, a system memory 1406 (typically RAM, but which may also include ROM, flash RAM, or the like), an input/output controller 1408, an external audio device, such as a speaker system 1410 via an audio output interface 1412, an external device, such as a disk, card, or chip unit 1432 operative to receive a disk, memory card, or a chip 1434; a display screen 1414 via display adapter 1416; serial ports 1418 and mouse 1420; a keyboard 1422 (interfaced with a keyboard controller 1424); multiple USB devices 1426 (interfaced with a USB controller 1428); a storage interface 1430; a host bus adapter (HBA) interface card 1436A operative to connect with a Fibre Channel network 1438; a host bus adapter (HBA) interface card 1436B operative to connect to a SCSI bus 1440; and an optical disk drive 1442 operative to receive an optical disk 1444. Also included are a mouse 1446 (or other point-and-click device, coupled to bus 1402 via serial port 1418), a network modem 1448 (coupled to bus 1402 via serial port 1418), and a network interface 1450 (coupled directly to bus 1402).

Bus 1402 allows data communication between central processor 1404 and system memory 1406, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. Applications resident with computer system 1400 are generally stored on and accessed via a non-transitory computer readable medium, such as a hard disk drive (e.g., fixed disk drive 1452), an optical drive (e.g., optical disk drive 1442), or other storage medium. Additionally, applications can be in the form of electronic signals modulated in accordance with the application and data communication technology when accessed via network modem 1448 or network interface 1450.

Storage interface 1430, as with the other storage interfaces of computer system 1400, can connect to a standard computer readable medium for storage and/or retrieval of information, such as a fixed disk drive 1452. Fixed disk drive 1452 may be a part of computer system 1400 or may be separate and accessed through other interface systems. Network modem 1448 may provide a direct connection to a remote server via a telephone link or to the Internet via an internet service provider (ISP). Network interface 1450 may provide a direct connection to a remote server via a direct network link to the Internet via a POP (point of presence). Network interface 1450 may provide such connection using wireless techniques, including digital cellular telephone connection, Cellular Digital Packet Data (CDPD) connection, digital satellite data connection or the like.

As illustrated in FIG. 14, the glass-based electrochemical sensor 1460 may b e integrated into the computer system 1400. When the electrochemical sensor detects a chemical or a programmed level of a chemical, a signal may be transmitted through the bus to the central processor 1404, which may then access instructions on the system memory 1406, that dictate what subsequent action is taken by the central processor 1404, if any.

Many other devices or subsystems (not shown) may be connected in a similar manner (e.g., document scanners, digital cameras and so on). Conversely, all of the devices shown in FIG. 14 need not be present to practice the present systems and methods. The devices and subsystems can be interconnected in different ways from that shown in FIG. 14. The operation of at least some of the computer system 1400 such as that shown in FIG. 14 is readily known in the art and is not discussed in detail in this application. Code to implement the present disclosure can be stored in a non-transitory computer-readable medium such as one or more of system memory 1406; a disk, memory card, or chip 1434; a fixed disk drive 1452; or optical disk 1444. The operating system provided on computer system 1400 may be MS-DOS®, MS-WINDOWS®, OS/2®, UNIX®, Linux®, or another known operating system.

It should be appreciated that some components, features, and/or configurations may be described in only one embodiment, but these same components, features, and/or configurations may be applied or used in or with many other embodiments and should be considered applicable to the other embodiments, unless stated otherwise or unless such a component, feature, and/or configuration is technically impossible to use with the other embodiment. Thus, the components, features, and/or configurations of the various embodiments may be combined in any manner and such combinations are expressly contemplated and disclosed by this statement.

The terms recited in the claims should be given their ordinary and customary meaning as determined by reference to relevant entries in widely used general dictionaries and/or relevant technical dictionaries, commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used in a manner that is more expansive than its ordinary and customary meaning, the term should be given its ordinary and customary meaning plus the additional expansive meaning, or (b) if a term has been explicitly defined to have a different meaning by reciting the term followed by the phrase "as used in this document shall mean" or similar language (e.g., "this term means," "this term is defined as," "for the purposes of this disclosure this term shall mean," etc.).

References to specific examples, use of "i.e.," use of the word "invention," etc., are not meant to invoke exception (b) or otherwise restrict the scope of the recited claim terms. Other than situations where exception (b) applies, nothing contained in this document should be considered a disclaimer or disavowal of claim scope.

The subject matter recited in the claims is not coextensive with and should not be interpreted to be coextensive with any embodiment, feature, or combination of features shown in this document. This is true even if only a single embodiment of the feature or combination of features is illustrated and described in this document. Thus, the appended claims should be given their broadest interpretation in view of the prior art and the meaning of the claim terms.

Spatial or directional terms, such as "left," "right," "front," "back," and the like, relate to the subject matter as it is shown in the drawings. However, it is to be understood that the described subject matter may assume various alternative orientations and, accordingly, such terms are not to be considered as limiting.

Articles such as "the," "a," and "an" may connote the singular or plural. Also, the word "or" when used without a preceding "either" (or other similar language indicating that "or" is unequivocally meant to be exclusive—e.g., only one of x or y, etc.) shall be interpreted to be inclusive (e.g., "x or y" means one or both x or y).

The term "and/or" shall also be interpreted to be inclusive (e.g., "x and/or y" means one or both x or y). In situations where "and/or" or "or" are used as a conjunction for a group of three or more items, the group should be interpreted to include one item alone, all the items together, or any combination or number of the items. Moreover, terms used in the specification and claims such as have, having, include, and including should be construed to be synonymous with the terms comprise and comprising.

Unless otherwise indicated, all numbers or expressions, such as those expressing dimensions, physical characteristics, and the like, used in the specification (other than the claims) are understood to be modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques.

All disclosed ranges are to be understood to encompass and provide support for claims that recite any and all subranges or any and all individual values subsumed by each range. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

All disclosed numerical values are to be understood as being variable from 0-100% in either direction and thus provide support for claims that recite such values or any and all ranges or subranges that may be formed by such values. For example, a stated numerical value of 8 should be understood to vary from 0 to 16 (100% in either direction) and provide support for claims that recite the range itself (e.g., 0 to 16), any subrange within the range (e.g., 2 to 12.5) or any individual value within that range (e.g., 15.2).

The flowchart and block diagrams in the flow diagrams illustrate the architecture, functionality, and operation of possible implementations of systems, methods, and products according to various embodiments of the present embodiments.

It should be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that may direct a computer or other programmable data processing apparatus to function in a particular manner, such that the instructions stored in the computer-readable medium produce an article of manufacture including instruction means which implement the function/act specified in the flowchart and/or block diagram block or blocks.

The techniques described in this document may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The operations presented in this document are not inherently related to any particular apparatus. Various general-purpose systems may also be used with programs in accordance with the teachings in this document, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described in this document, and any references to specific languages are provided for disclosure of enablement and best mode of the present exemplary system and method.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and may be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A glass electrochemical sensor, comprising:
  a glass substrate including a plurality of through glass vias (TGVs), wherein the plurality of TGVs are at least partially filled with an electrode material;
  an electrode disposed on a bottom surface of the glass substrate adjacent to at least one of the TGVs; and
  a first glass layer comprising a cavity;
  wherein the bottom surface of the glass substrate is bonded to a first side of the first glass layer such that the electrode is positioned within the cavity.

2. The glass electrochemical sensor of claim 1, further comprising:
  at least two electrodes disposed on the bottom surface of the glass substrate;
  wherein at least two of the plurality of TGVs are electrical TGVs that include conductive material that is electrically connected to the at least two electrodes.

3. The glass electrochemical sensor of claim 2, wherein the glass substrate further comprises:
  a plurality of contact TGVs containing a conductive material; and
  a plurality of connection bridges electrically connecting the conductive material in the electrical TGVs with the conductive material in the contact TGVs.

4. The glass electrochemical sensor of claim 3, wherein:
  the plurality of electrical TGVs are positioned around a center of the glass substrate; and
  the plurality of contact TGVs are positioned about a periphery of the glass substrate.

5. The glass electrochemical sensor of claim 1, further comprising:
  a second glass layer, wherein:
  the second glass layer is bonded to a second side of the first glass layer; and
  the second glass layer is solid, such that the cavity in the first glass layer is sealed by glass on all sides except the side defined by the glass substrate.

6. The glass electrochemical sensor of claim 5, wherein the second glass layer is bonded to the first glass layer by at least one of adhesive, glass frit, or laser sealing.

7. The glass electrochemical sensor of claim 6, wherein the bonded first glass layer and second glass layer are coupled to a printed circuit board configured to detect a concentration of a gas entering the cavity in the first glass layer.

8. The glass electrochemical sensor of claim 1, wherein the glass substrate comprises at least one of Pyrex®, quartz, soda-lime glass, aluminosilicate glass, alkali-aluminosilicate glass, borosilicate glass, alkali-borosilicate glass, aluminoborosilicate glass, alkali-aluminoborosilicate glass, or fused silica glass.

9. An electronic device comprising the glass electrochemical sensor as recited in any one of claim 1.

* * * * *